United States Patent
Lipinski et al.

(10) Patent No.: US 7,324,419 B2
(45) Date of Patent: Jan. 29, 2008

(54) FOCUS CONTROL VIA AC INPUT SIGNAL

(75) Inventors: Greg J. Lipinski, Loveland, CO (US); Andrew L Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 622 days.

(21) Appl. No.: 11/009,432

(22) Filed: Dec. 11, 2004

(65) Prior Publication Data

US 2006/0126453 A1    Jun. 15, 2006

(51) Int. Cl.
G11B 5/09 (2006.01)
(52) U.S. Cl. .............. 369/53.23; 369/44.34; 347/224
(58) Field of Classification Search ........ None
See application file for complete search history.

(56) References Cited

U.S. PATENT DOCUMENTS

| | | | |
|---|---|---|---|
| 4,027,217 A | 5/1977 | Harman | |
| 4,967,286 A | 10/1990 | Nomula et al. | |
| 5,182,741 A | 1/1993 | Maeda et al. | |
| 5,398,231 A | 3/1995 | Shin et al. | |
| 5,498,509 A | 3/1996 | Shin et al. | |
| 5,608,717 A | 3/1997 | Ito et al. | |
| 5,608,718 A | 3/1997 | Schiewe | |
| 5,627,895 A | 5/1997 | Owaki | |
| 5,675,570 A | 10/1997 | Ohira et al. | |
| 5,688,173 A | 11/1997 | Kitahara et al. | |
| 5,729,533 A | 3/1998 | Marquardt | |
| 5,745,457 A | 4/1998 | Hayashi et al. | |
| 5,748,607 A | 5/1998 | Ohira et al. | |
| 5,751,671 A | 5/1998 | Koike et al. | |
| 5,764,430 A | 6/1998 | Ottesen et al. | |
| 5,766,495 A | 6/1998 | Parette | |
| 5,781,221 A | 7/1998 | Wen et al. | |
| 5,846,131 A | 12/1998 | Kitahara | |
| 5,875,156 A | 2/1999 | Ito et al. | |
| 5,915,858 A | 6/1999 | Wen | |
| 5,949,752 A | 9/1999 | Glynn et al. | |
| 5,958,651 A | 9/1999 | van Hoof et al. | |
| 5,967,676 A | 10/1999 | Cutler et al. | |
| 5,997,976 A | 12/1999 | Mueller et al. | |
| 6,019,151 A | 2/2000 | Wen et al. | |
| 6,026,066 A | 2/2000 | Maezawa | |
| 6,034,930 A | 3/2000 | Kitahara | |
| 6,074,031 A | 6/2000 | Kahle | |
| 6,102,800 A | 8/2000 | Kitahara et al. | |
| 6,104,677 A | 8/2000 | Kirihara et al. | |
| 6,124,011 A | 9/2000 | Kern | |
| 6,160,789 A | 12/2000 | Abraham | |

(Continued)

OTHER PUBLICATIONS

International Search Report (PCT/US2005/038525), dated Mar. 30, 2006.

*Primary Examiner*—Muhammad N. Edun (57) ABSTRACT

A method of mapping a surface of a printable medium comprises illuminating the surface with electromagnetic radiation and focusing the electromagnetic radiation with a focusing means. The method also includes modulating the position of the focusing means using an actuator, wherein the actuator has a resonant frequency. An input signal is provided to the actuator, wherein the input signal comprises an AC waveform having a frequency. The frequency does not correspond to the resonant frequency of the actuator. The waveform does not have higher harmonics corresponding to the resonant frequency of the actuator.

31 Claims, 9 Drawing Sheets

U.S. PATENT DOCUMENTS

| | | |
|---|---|---|
| 6,202,550 B1 | 3/2001 | Lee et al. |
| 6,264,295 B1 | 7/2001 | Bradshaw et al. |
| 6,266,305 B1 | 7/2001 | Buchler |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 7,084,894 B2 * | 8/2006 | Van Brocklin et al. .. 369/53.23 |
| 2002/0114230 A1 | 8/2002 | Kadlec et al. |
| 2002/0131339 A1 | 9/2002 | Kadlec |
| 2002/0191517 A1 * | 12/2002 | Honda et al. ............ 369/53.29 |
| 2003/0161224 A1 | 8/2003 | Anderson et al. |
| 2004/0004912 A1 | 1/2004 | Morishima |
| 2004/0027953 A1 | 2/2004 | Yukawa |
| 2004/0062157 A1 | 4/2004 | Kawabe |
| 2005/0056085 A1 | 3/2005 | Liebert |
| 2005/0057639 A1 | 3/2005 | Van Brocklin |

* cited by examiner

| Actuator Phase Lag Calibration Table 298 ||
|---|---|
| Input Signal Frequency 600 | Phase Lag 605 |
| 2 Hz | $f^3 = +2$ deg |
| 3 Hz | $f^3 = +4$ deg |
| 4 Hz | $f^3 = +6$ deg |
| 5 Hz | $f^3 = +8$ deg |

Fig. 5A

| Voltage Data Look-up Table 296 ||||
|---|---|---|---|
| Sector of Disc 615 | 0<r<1" 620 | 1"<r<2" 625 | 2"<r<3" 630 |
| 0-44 deg | $V=V_1, f^3 = f^3_1$ | $V=V_9, f^3 = f^3_9$ | $V=V_{17}, f^3 = f^3_{17}$ |
| 45-89 deg | $V=V_2, f^3 = f^3_2$ | $V=V_{10}, f^3 = f^3_{10}$ | $V=V_{18}, f^3 = f^3_{18}$ |
| 90-134 deg | $V=V_3, f^3 = f^3_3$ | $V=V_{11}, f^3 = f^3_{11}$ | $V=V_{19}, f^3 = f^3_{19}$ |
| 135-179 deg | $V=V_4, f^3 = f^3_4$ | $V=V_{12}, f^3 = f^3_{12}$ | $V=V_{20}, f^3 = f^3_{20}$ |
| 180-224 deg | $V=V_5, f^3 = f^3_5$ | $V=V_{13}, f^3 = f^3_{13}$ | $V=V_{21}, f^3 = f^3_{21}$ |
| 225-269 deg | $V=V_6, f^3 = f^3_6$ | $V=V_{14}, f^3 = f^3_{14}$ | $V=V_{22}, f^3 = f^3_{22}$ |
| 270-314 deg | $V=V_7, f^3 = f^3_7$ | $V=V_{15}, f^3 = f^3_{15}$ | $V=V_{23}, f^3 = f^3_{23}$ |
| 315-360 deg | $V=V_8, f^3 = f^3_8$ | $V=V_{16}, f^3 = f^3_{16}$ | $V=V_{24}, f^3 = f^3_{24}$ |

FOCUS CONTROL VIA AC INPUT SIGNAL

CROSS-REFERENCE TO RELATED APPLICATIONS

This patent application is related to commonly-assigned U.S. patent application Ser. No. 10/660,991 entitled "Optical Disk Drive Focusing Apparatus", filed on Sep. 12, 2003, and Ser. No. 10/661,394, entitled "Optical Disk Drive Focusing Apparatus", filed on Sep. 12, 2003.

BACKGROUND OF THE DISCLOSURE

Optical discs, such as compact discs (CD) and digital versatile discs (DVD) are form of computer readable media which provide extensive storage for digital information. A computer or other optical disc player or reader has an optical disc drive (ODD) which may be used to read from and/or write to one or more sides of the disc. The optical disc drive may include an optical pickup unit (OPU) which may be configured with a laser and sensors adapted for reading and/or writing data to the disc. Various ODDs and OPUs are available, and are manufactured to specifically read and write to an optical disc.

Some optical discs are capable of having data written to the disc and/or having visible or optically detectible text or graphics marked on a surface of the disc. Some computers or other optical disc players or readers may be configured to write data to a disc and/or mark optically visible text and/or graphics onto a surface of the disc. In some such devices, an OPU assembly may be used to write the data and/or optically mark the surface of the optical disc or other light-imageable medium. In order to accurately write data and/or produce optical marks of high image quality it is often important to properly focus the OPU assembly with respect to the surface of the optical disc.

BRIEF DESCRIPTION OF THE DRAWINGS

Features and advantages of the disclosure will be readily appreciated by persons skilled in the art from the following detailed description of exemplary embodiments thereof, as illustrated in the accompanying drawings, in which.

DETAILED DESCRIPTION OF THE DISCLOSURE

In the following detailed description and in the several figures of the drawing, like elements are identified with like reference numerals.

Commonly assigned U.S. patent application Ser. Nos. 10/660,991 and 10/661,394 each discuss exemplary embodiments of optical disc drive focusing apparatuses and media marking device systems suitable for use in exemplary embodiments discussed in this application.

Figure 1:
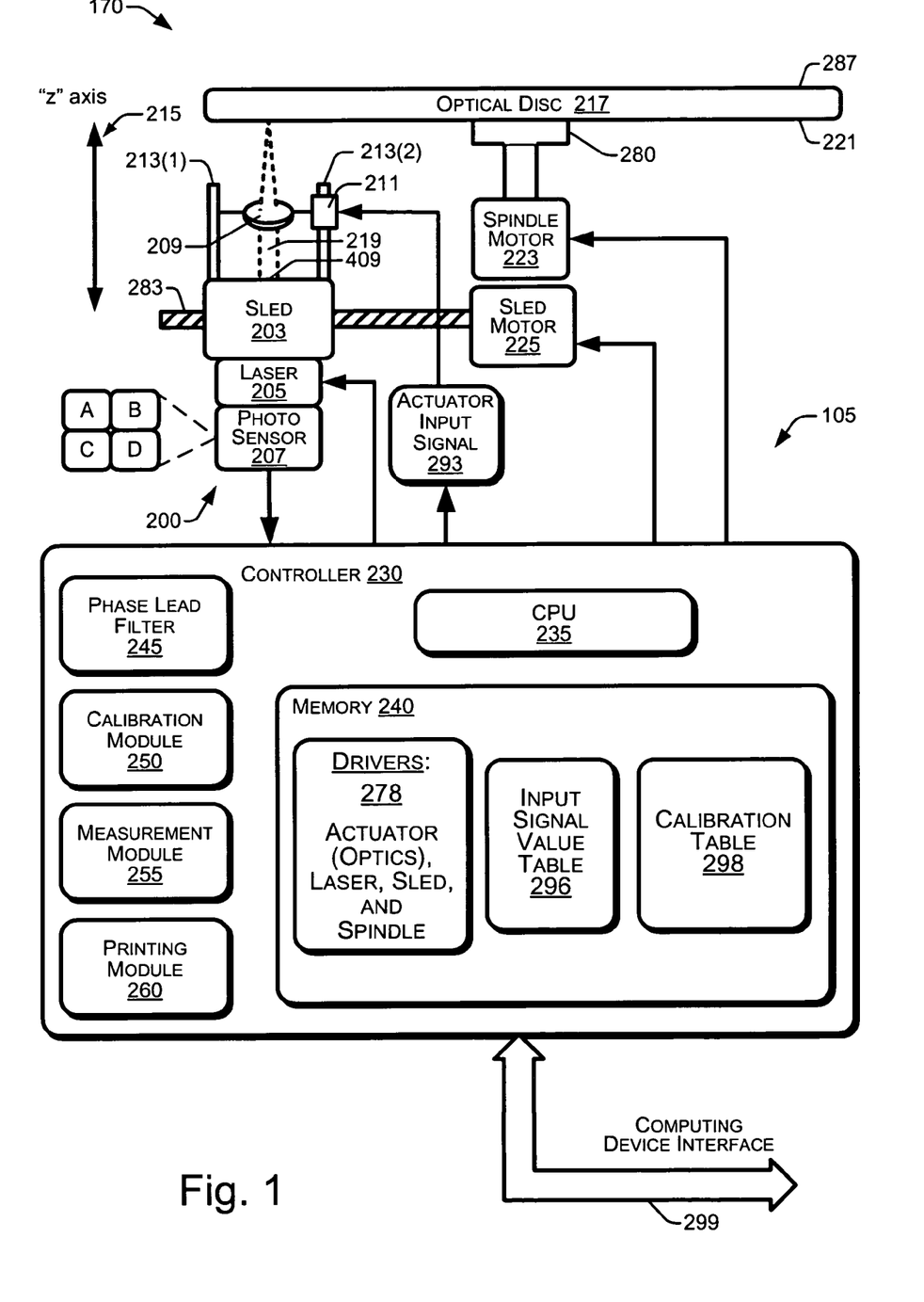
FIG. 1 illustrates an exemplary embodiment of a marking device.

FIG. 1 illustrates an exemplary embodiment of a marking device 105. In an exemplary embodiment, the marking device 105 comprises a drive system 170 and a controller 230. In an exemplary embodiment, the drive system 170 moves a surface of a medium 217 relative to an electromagnetic radiation source 205. In an exemplary embodiment, the medium 217 has a surface 221 on which marks may be formed upon exposure to electromagnetic radiation 219 from an electromagnetic radiation source 205. In an exemplary embodiment, the medium 217 is a light-sensitive medium on which visible marks are formed upon exposure to light and the electromagnetic radiation source 217 is a light source, for example a laser. In an exemplary embodiment, the controller 230 may control the drive system 170 to direct electromagnetic radiation to make marks on various positions on the surface to create an image responsive to image data.

In an exemplary embodiment, the drive system 170 may include an optical disc drive (ODD) having an optical pick-up unit assembly (OPU) 200. In an exemplary embodiment, the ODD may be a LiteON 48246S and the OPU may be an HOP 6061T OPU. In an exemplary embodiment, the medium 217 may be a disc, which may be an optical disc, and the OPU may include an electromagnetic radiation source 205, which may be a laser, a sled 203, a photo sensor 207, an objective lens or optics 209 and an actuator 211. The actuator 211 may respond to an input signal, which may be voltage or current, to cause the optics to move the focal point.

In an exemplary embodiment, the spindle motor 223 may spin an optical disc 217 past a laser 205. The sled motor 225 may be arranged to move the laser 205, mounted on a sled 203, to different radial positions with respect to the center of the disc. The operation of the spindle motor 223 and sled motor 225 may combine to move the surface 221 of the disc 217 relative to a laser 205 to permit the laser to create the image on imageable portions of the disc.

In an exemplary embodiment, the optics 209 are mounted on lens supports 213(1) and 213(2) and are configured to travel along a "z" axis 215 which is generally perpendicular to the surface 221 of the medium 217. In an exemplary embodiment, the actuator adjusts the focal point by moving the optics toward and away from the surface 221 of the medium 217. In an exemplary embodiment, each location on the surface of the medium on which a mark may be made during imaging is at a distance from the optics or electromagnetic radiation source, and the optics may be adjusted to achieve the desired degree of focus when that location is to be imaged.

In an exemplary embodiment, electromagnetic radiation 219, which may be a laser beam, is generated by the electromagnetic radiation source 205, which may be a laser, and directed toward an surface 221 (the label surface) of a medium 217. In an exemplary embodiment, energy from the laser beam 219 may be capable of creating laser marks corresponding to label image date to render an image on the surface 221 of the optical disc 217.

In an exemplary embodiment, the controller 230 may be implemented as a printed circuit board employing a combination of various components discussed below with respect to the media marking system 100 of FIG. 9. In an exemplary embodiment, the controller 230 may include a processor 235 for processing computer/processor-executable instructions from various components stored in a memory 240. Processor 235 may be one or more of the processors 115 discussed below with respect to the media marking system 100 of FIG. 9. Memory 240 may be non-volatile memory 130 and/or firmware 140 of disc media marking system 100 of FIG. 9.

In an exemplary embodiment, the controller 230 may include a phase lead filter 245, a calibration module 250, a measurement module 255, and a printing module 260.

In an exemplary embodiment, drivers 278 may include a laser driver, sled driver, and spindle driver, which may be stored in memory 240 and executable on processor 235. In an exemplary embodiment, the drivers may be software components. In an exemplary embodiment, one or more of the drivers may be implemented as firmware and/or hardware components.

In an exemplary embodiment, a spindle driver drives a spindle motor 223 to control a rotational speed of optical disc 217 via a spindle 280. The spindle driver operates in conjunction with a sled driver which drives the sled motor 225 to control coarse radial positioning of OPU assembly 200 with respect to disc 217 along a sled drive mechanism 283.

In a focus position measurement implementation, the sled 205 of the OPU assembly 200 is moved along the sled drive mechanism 283 to various radii positions of optical disc 217.

In a label surface marking implementation, the rotational speed of disc 217 and the radial position of OPU assembly 200 are controlled such that laser marks are written on the disc 217 as the label side surface 221 moves past the laser beam 219 at a constant linear velocity.

In an exemplary embodiment, a laser driver controls the firing of laser beam 219 to write laser marks corresponding to a label image onto the label side surface 221. Additionally, the laser driver controls the intensity of the laser beam 219 to read data maintained on the data side 287 of the optical disc 217 when the disc is positioned such that the data side 287 of the passes over the laser beam 219. In certain cases, the same side is used for data and labeling.

In an exemplary embodiment, photo sensor 207 may provide laser focus feedback to the laser driver. For example, a photo sensor 207 may have four individual sensor quadrants; A, B, C and D. Quadrants A, B, C and D may be configured to measure reflected light independent of one another. In particular, voltage is measured by the quadrants A, B, C and D. When the sum of measured voltage of the quadrants A, B, C and D are at a relative maximum, it is an indication that the objective lens is at a location on the "z" axis that places the laser beam in focus.

In an exemplary embodiment, a photo sensor 207 may be configured to the controller 230, where photo sensor 207 allows the controller 230 to recognize patterns on the optical disc 217 as it rotates.

In an exemplary embodiment, the drivers 278 may include a driver for actuator 211. The actuator driver may be executable on processor 235 to adjust an actuator input signal source 293 which provides an input to actuator 211. Actuator driver may account for any offset values to compensate for different sweep rates of the OPU assembly 200 as performed by actuator 211. The actuator driver may allow for a DC voltage offset. As discussed further below, the DC voltage offset is used to provide consistent time period of an in focus measurement particular sweep frequency during a calibration implementation. For each sweep frequency there is a DC voltage offset that provides that in focus takes place consistently per a particular time period. The DC voltage offset may be a delay or advance in the voltage cycle.

In an exemplary embodiment, the data profile, which may include an input signal value table 296, is configured as a look-up table to store input values, which may be voltages, which are to be provided to generate the appropriate actuator input signal source 293. When the actuator input signal source 293 is a voltage source, table 296 stores DC voltage offset values to compensate for and particular to specific sweeping frequencies. Furthermore, table 296 stores particular locations on the medium, which may be an optical disc, which correspond to an appropriate input voltage, sweeping frequency, and offset that allow the OPU optics or objective lens 209 to be placed in proper focus for particular locations on the medium. In an exemplary embodiment, a calibration table 298 may be provided for providing, creating and storing offset values that are determined in a calibration procedure, where the offset values correspond to particular sweeping frequencies.

In an exemplary embodiment, a particular input signal value, for example voltage value or current value, may be applied to the actuator for achieving the desired focus to form the marks at a corresponding particular location. In an exemplary embodiment, the signal values for each location may be stored in a data profile corresponding to the proper value for each location to achieve the correct amount of focus. In an exemplary embodiment, the data profile may include an input signal value table 296 and a calibration table 298. The input signal table 296 may store the values of input signal voltage or current corresponding to the desired focus for a particular position on the medium. In an exemplary embodiment, the controller may be calibrated to account for a phase lag in the input signal and the response of the actuator. Phase lag values may be stored in a calibration table 298.

In an exemplary embodiment, the controller controls the drive assembly to generate the data profile, in part, by mapping the surface of the medium prior to creating the image. In an exemplary embodiment, the "read" power level used to map the medium or disc may be lower than the power used for imaging the medium. For example, the "read" power level may be about 5 mW or less. In an exemplary embodiment, the media marking device uses a feed-forward mechanism in which the weighted sum of sinusoidal components are used to adjust the focus actuator offset at various locations around the disc. In an exemplary embodiment, the coefficients may be updated periodically. Updating the coefficients may comprise sweeping the focus actuator in and out of focus through a focus range, after a particular amount of radial travel has occurred.

In an exemplary embodiment, sweeping the focus actuator in and out of focus through a focus range is accomplished by applying an input signal with a particular waveform to the actuator. Using a linear ramp waveform, for example a triangle wave or sawtooth wave, permits relatively simple interpolation to determine the location of best focus. Triangle, sawtooth and other waveforms, however, may have significant harmonics which may excite a resonant frequency of the actuator, thereby resulting in false or less accurate indications of SUM signal peaks (FIG. 3) which are used to determine the best focus offset input signal values.

In an exemplary embodiment, the actuator has a resonant frequency or frequencies or range or ranges of resonant frequencies, in which resonant vibrations in a direction toward and away from the surface of the medium may be excited if the actuator is moved cyclically through the "Z" axis at the resonant frequency or where the waveform of the cyclical movement includes harmonics corresponding to a resonant frequency. In an exemplary embodiment, the periodic motion of the optics toward and away from the medium, while mapping the surface, may excite the actuator to produce vibrations in the resonant frequency or frequencies. As a result, the optics may swing through a distance which is greater than the distance expected, based on the voltage bias input to the actuator.

In an exemplary embodiment, if precise measurements are desired, any deviation of the focus actuator from the expected location may introduce an unacceptable degree of error. There may be uncertainty due to not knowing the precise frequency of the actuator's resonances. Not knowing the Q of the resonance may affect the magnitude of the resonance or resonances, and may also affect the accuracy of the measurement. The actuator may make unpredictable excursions from the expedited Z position, due to the magnitude and phase of these resonances. If the magnitude of the actuator's response to the higher harmonics were less than 0.025 percent of the intended movement, the response may be satisfactorily accurate. However, where the actuator's response to the higher harmonics is greater than 0.025 percent of the intended and/or expected movement, then the measurements may be unacceptable. As a further result, the surface mapping of the medium may not be as accurate as desired.

In an exemplary embodiment, the resonant frequency of the actuator may be determined or be dependent, in part, on the mass of the optics and actuator and any other portion that is moved when the actuator moves, the frictional forces developed by movement of the actuator, and/or the electrical, magnetic, mechanical, frictional forces developed by or experienced during the movement of the actuator. For example, an actuator may have multiple resonances. One of the larger resonances may have a frequency determined by the spring constant of wire springs in the X direction and the mass of the movable part of the actuator. A larger movable part of the actuator's mass may lower the frequency, and a lower spring constant (k) of the springs holding this mass may lower the resonant frequency. In an exemplary embodiment, these parameters may vary from unit to unit in manufacturing. Other resonances may be present in the frame or body of the actuator, and may also be present inside the moveable part of the actuator.

In an exemplary embodiment, a computing device interface 299 interfaces the controller 230 of the drive system 170 with another electronic or computing device to receive image data, an image file or a label file (not shown). The computing device interface 299 may be implemented as an ATAPI (Advanced Technology Attachment packet Interface), which may be one of many small computer parallel or serial device interfaces. In an exemplary embodiment, the computing device interface 299 may be an SCSI (small computer system interface), which may be a device interface of attaching peripheral devices to computers. SCSI may define the structure of commands, the way commands are execute, and the way status is processed. In further exemplary embodiments, the interface may include a Parallel Interface Fiber Channel, IEEE 1394, USB (Universal Serial Bus), and ATA/ATAPI. ATAPI may be a command execution protocol for use on an ATA interface so that CD-ROM and tape rives can be connected via the same ATA cable with an ATA hard disc drive. ATAPI devices may include CD-ROM drives, CD-R drives, CD-RW drives, DVD drives, tape drives, super-floppy drives (e.g., ZIP and LS-120), and the like.

Figures 2, 3:
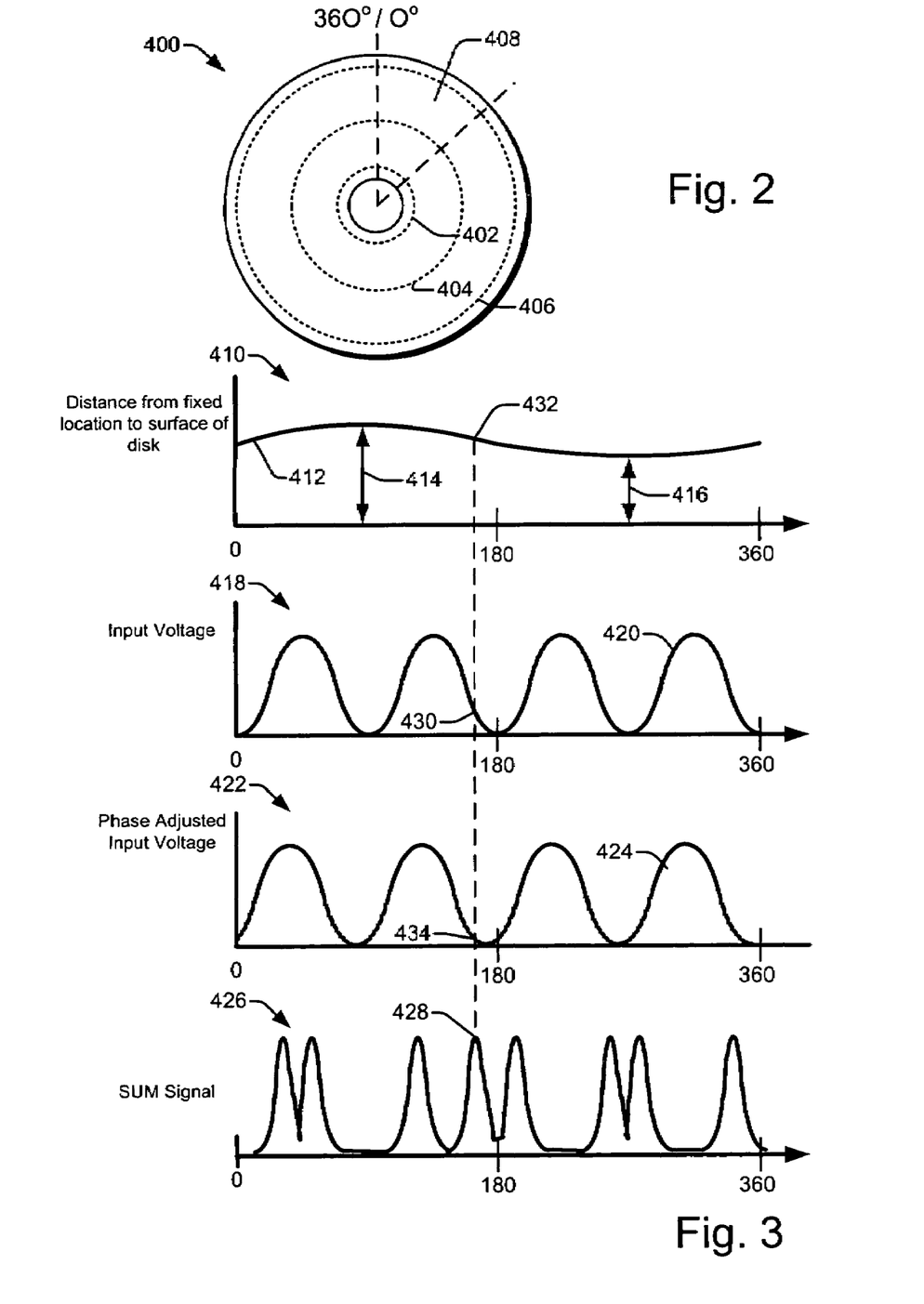
FIG. 2 illustrates an exemplary embodiment of a print medium.
FIG. 3 illustrates an exemplary method of mapping the surface of a print medium.

FIG. 2 illustrates an exemplary medium 217 which may an optical disc. The drive system 170 (FIG. 1) may image the disc by exposing the disc on each of a number of concentric rings or tracks. The system may image portions along a ring 402 as the disc spins past the laser at one radial position and image portions along other rings 404, 406 with the disc spinning past the laser while the laser is positioned at different radial positions. The imageable portions of the disc may include those portions of the surface of the disc from at least the inner-most ring to the outer-most ring.

FIG. 3 illustrates an exemplary embodiment of generating a data profile, for example an input signal table 296 (FIGS. 1 and 5), which may be an input voltage or input current look-up table. In an exemplary embodiment, the data profile or input signal table provides values, for example for voltage or current, for operation of the actuator to focus the optics on a plurality of locations on an imageable region of the surface of the medium, for example an optical disc. Graph 410 illustrates a curve 412 which illustrates the curvature of a surface 221 of disc 217. For example, curve 412 may represent the distance from a fixed location—such as the tip 409 of a laser 205—to a surface 221 of a disc 217 as it varies as the disc rotates through 360 degrees. For example, the disc is a greater distance 414 from the fixed location 286 after turning approximately 90 degrees and a lesser distance 416 after turning 270 degrees.

Graph 418 illustrates an AC component of an input voltage which may be applied to the actuator 211. In an exemplary embodiment, the input voltage is selected to such that the AC component of the input voltage does not correspond to a resonant frequency of the actuator and so that the AC component does not have significant higher harmonics corresponding to a resonant frequency of the actuator. In an exemplary embodiment, the AC component of the input voltage is sinusoidal as shown in graph 418 of FIG. 3.

In an exemplary embodiment, the data profile includes values for various angular positions around each of a number of tracks or rings. In an exemplary embodiment, the controller controls the disc to spin at a rate that results in a constant linear speed of the surface past the laser for each of the radial positions at which the electromagnetic radiation source is placed. This may result in the controller and the drive assembly 170 causing the disc to spin at different angular speeds at each of the successive different radial distances.

In an exemplary embodiment, the waveform is selected to result in four full cycles during one revolution. Since the disc is controlled to have a constant linear velocity of the surface past the laser, the time for a revolution changes from a faster time to a slower time as the laser moves from an inner-most position to an outer-most position of the disc. As a result, the frequency of the AC input waveform changes from a higher frequency to a lower frequency—and moves through a range of frequencies in between. In an exemplary embodiment, the AC input voltage waveform will be selected so that there are no frequencies throughout the range of frequencies at which the frequency corresponds to a resonant frequency of the actuator or at which the waveform has significant harmonics corresponding to a resonant frequency of the actuator.

In an exemplary embodiment, the actuator may have a first resonance which may appear in a frequency measured in tens of Hz. These lower-frequency, first resonances may be those resonances which are primarily determined by the mass and spring constant of an actuator. For example, an actuator may have a resonance at about 72 Hz with a 20 dB increase in response at that frequency, and may have a second resonance at 20 KHz. In an exemplary embodiment, a second resonance may be a cluster of several resonances. In another exemplary embodiment, an OPU may have a first resonance at about 40 Hz. In an exemplary embodiment, the AC input waveform is selected to be sinusoidal and be within a range of 2.74 Hz to about 6.63 Hz for a disc with an imageable area with a 24 mm inner diameter and a 58 mm outer diameter and with a linear velocity of 0.25 m/s. In an exemplary embodiment, this range of frequencies may double with a linear velocity of 0.5 m/s. In an exemplary embodiment, the frequency of the sinusoidal AC voltage input is selected so that it has four maxima during one revolution of the disc. In an exemplary embodiment, the disc spins to provide a linear velocity from about 0.25 m/s to about 1.0 m/s.

Graph 426 (FIG. 3) illustrates SUM signals generated, for example, by a photo sensor 207 (FIG. 1). In an exemplary embodiment, the laser is transmitting at a power level below the power level at which marking of the medium occurs. In an exemplary embodiment, the laser power during marking of the medium may be about 28 mW or higher and the power level during a "read" or sensing mode may be at about 5 mW or lower. The sum signal peaks correspond to angular positions of the disc at which the laser beam 209 is in focus on the surface of the disc. In an exemplary embodiment, the input signal waveform is selected to result in at least 8 SUM signal peaks 426. Each SUM peak represents a local maximum of data coming from the SUM sensor 207 (FIG. 1). Each SUM peak may be associated with a value of the input signal applied to the actuator to achieve focus in the particular location. For example, SUM peak 428 may be associated with a voltage 430 in graph 418. Accordingly, when the voltage associated with position 430 was applied to the actuator 211, when the disc was oriented at approximately 170 degrees, the optics were focused on point 432 on the surface 211 FIG. 1 of the disc 217. In an exemplary embodiment, the input signal value associated with the SUM peak may be stored in an input signal look-up table.

In an exemplary embodiment, a phase adjusted input signal may be used to determine an input signal value for a particular location which may provide more accurate focus. Graph 422 illustrates a phase adjusted input signal, which may be determined according to the calibration process described below with respect to FIG. 4. In an exemplary embodiment, the voltage 434 on the phase adjusted input signal may provide a more accurate focus value for a given position, and the signal value 434 may be saved in an input signal look-up table.

Figure 4:
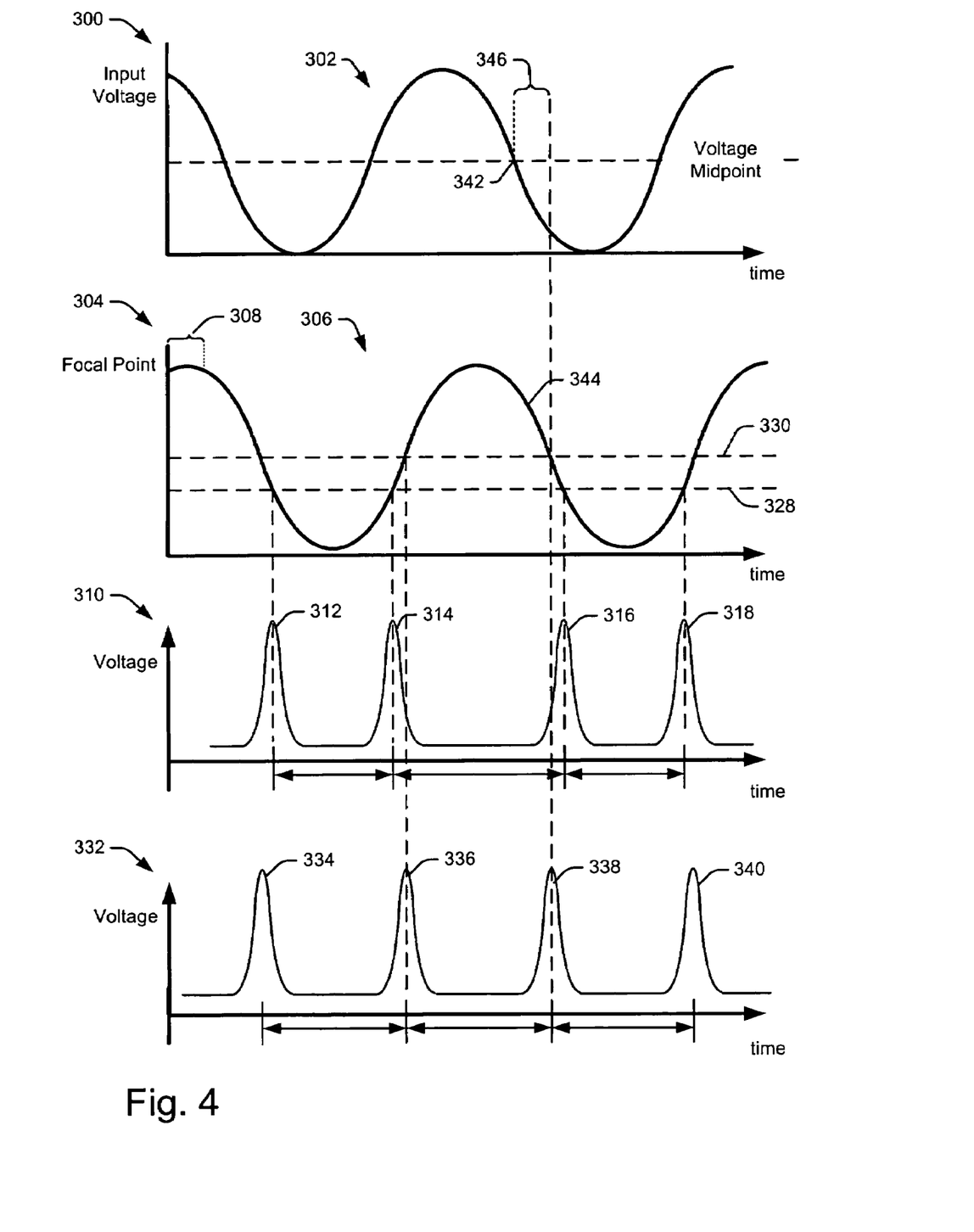
FIG. 4 illustrates an exemplary embodiment of a method of calibrating a marking device drive system.

FIG. 4 illustrates exemplary timeline curves for calibrating a phase delay of the actuator. The phase delay may be measured in degrees with respect to an AC signal, and may represent a phase delay between application of the AC signal to the actuator 2111 and an associated response in the focal point of the optics 209. The calibration may be performed while an optical disc is spinning or stationary, and may be performed when the sled 203, optics 209 and laser 205 are at any desired radial distance from the center of the optical disc. Where the disc is stationary, the calibration process may be more accurate, since variations in the disc will not result in error in the calibration calculation.

In some applications, phase delay may be influenced by the frequency of the AC component of the voltage applied to the actuator 211, it may be desirable to calibrate the phase delay of the actuator 211 for a variety of frequencies. A calibration phase shift for the actuator 211 for several frequencies may be useful due to the different frequencies at which the AC input voltage signal is applied for different positions of the electromagnetic radiation source. Accordingly, it may be desirable to determine the delay between signal and response at both lower and higher frequencies in the range of frequencies.

Referring to graph 300 of FIG. 4, waveform 302 represents the AC component of a composite AC and DC signal which may be applied to the actuator 211 (FIG. 1). Accordingly, the waveform 302 drives the focal optics 209 (FIG. 1) back and forth through a subset of the focal range of the optics 209. Where the AC component rides on a DC component of appropriate magnitude, the actuator 211 drives the focal optics 209 alternately into and out of focus on a surface, such as the disc surface 221. In an exemplary embodiment, the waveform is selected such that the waveform does not have a frequency corresponding to a resonant frequency of the actuator or harmonics corresponding to a resonant frequency of the actuator.

Referring to graph 304 of FIG. 4, waveform 306 represents the distance between the focal point of the optics 209 and a fixed location 409, such as the origin of a laser beam. The waveform 306, showing the focal point resulting from positioning of the optics 209, tracks (i.e. follows or responds to) the waveform 302, which represents the input signal given to the actuator 211 which controls the location of the optics 209 (FIG. 1). Note that the input signal 302 to the actuator 211 and optics 209, for a given frequency of the input signal 302, is measured during a calibration process, as will be seen. The phase angle by which the actuator lags behind the input signal 302 is seen at 308, and is typically expressed in degrees or as a time delay. By measuring this phase lag, better control over the actuator is possible. Accordingly, the phase lag may be determined, as seen below.

Graph 310 of FIG. 4 expresses the output of the SUM signal from the quad sensor 207 (FIG. 1). The SUM signal peaks 312-318 indicate that the focal optics passes through the focal point once during each movement 320-326 of the optics; i.e. as the optics move out and back, it is momentarily in focus once each direction. Note that the distance between all of the SUM peaks 312-318 is not the same. This is because the DC component of the waveform 302 is such that the focal point is somewhat nearer one end or the other of the travel path of the actuator 211 and optics 209. That is, the focal point is nearer one end of the range over which the optics focus than the other end. More particularly, the vertical lines extending from the SUM signal peaks 312-318 intersect the graphical description of the actuator movement 320-326 along line 328. Thus, line 328 indicates the point in each line segment 320-326 wherein the optics are in focus. The line 328 is offset from a line 330 representing a centerline of the travel path of the optics. This offset may be removed by adjusting the DC component of the signal 302 supplied to the actuator. That is, by changing the range over which the optics focuses periodically, the optics may be made to come into focus at the middle of the range. For a desirably adjusted DC offset, the line 330 may indicate the point in each line segment 320-326 where the optics are in focus.

Graph 332 of FIG. 4 shows the four SUM signal peaks 334-340 separated by a uniform distance. This may result from adjusting the DC component to the signal 302 applied to the actuator 211. That is, since the actuator 211 moves the optics 209 back and forth along a focal range, by adjusting the DC component to the actuator 211, the optics may be made to come into focus at the center of that range. The evenly spaced SUM peaks 334-340 may result when the DC component to signal 302 is desirably adjusted.

In an exemplary embodiment, the phase lag of the actuator may be determined by observing the lag time between one of the SUM peaks and the signal applied to the actuator 211 (FIG. 2) which caused that SUM peak. For example, SUM peak 338 is directly below the mid-point of actuator 211 and optics movement 324. However, the voltage that resulted in the actuator 211 being at the mid-point of its travel range is voltage 342. Voltage 342 is separated from actuator location 344 by time 346. Since the time 346 is known, the phase lag of the actuator 211 may be determined. Accordingly, the actuator 211 may be calibrated (i.e. phase lag determined) for the frequency of the signal 302.

Figure 5A:
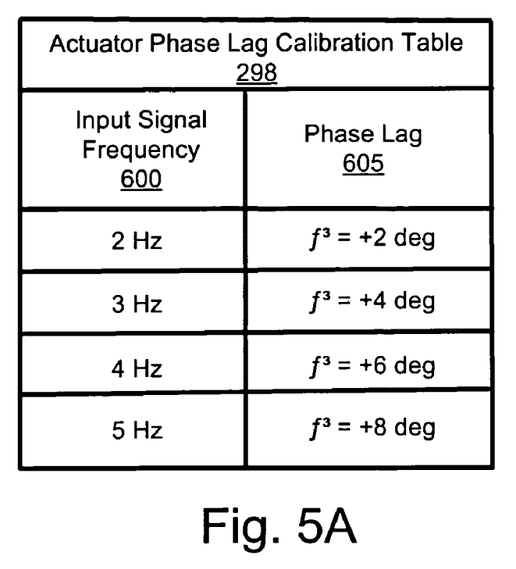
FIG. 5A illustrates an exemplary embodiment of a calibration table for a marking device.
Figure 5B:
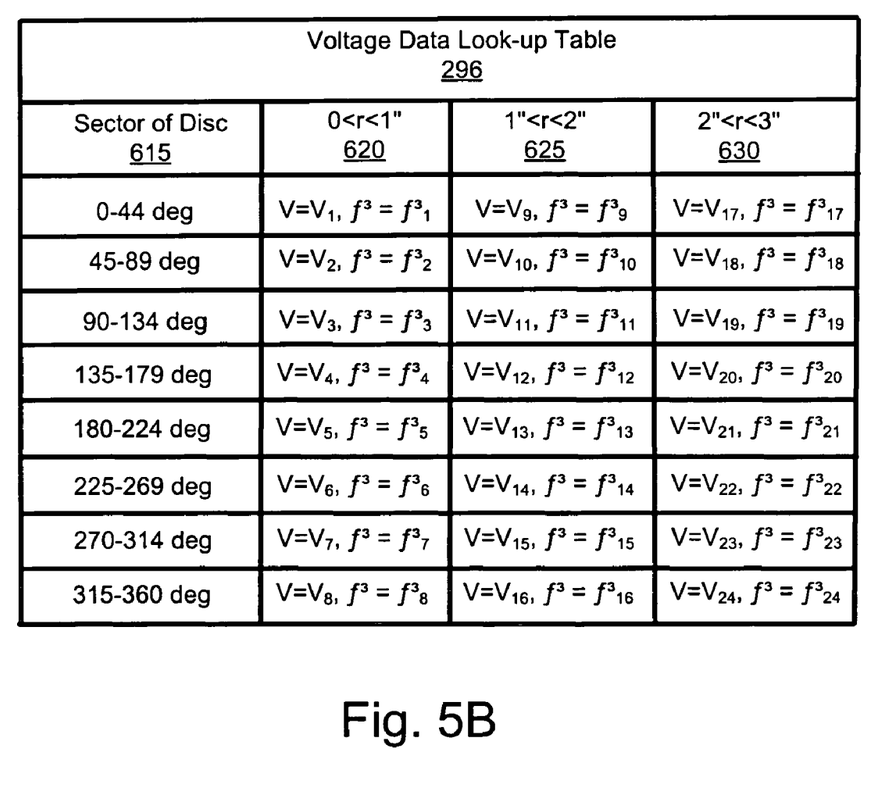
FIG. 5B illustrates an exemplary embodiment of an actuator input signal value table for a marking device.

In an exemplary embodiment, the actuator 211 may be calibrated for additional frequencies as desired. FIGS. 5A and 5B illustrate an exemplary representation of a calibration table 298 and input signal look-up table 296. FIG. 5A illustrates an exemplary calibration table calibrated for four frequencies, ranging from 2 to 5 Hz. For each frequency, a phase shift corresponding to a lag time associated with the operation of the actuator is shown. In an exemplary embodiment (not shown), the location on the disc at which the calibration was performed may be recorded. In an exemplary embodiment, a calibration table 298 may include a set of four frequency/phase pairs which may extend over the minimum and maximum range of available frequencies. In an exemplary embodiment, frequencies for which the phase shift is not determined may be interpolated between two frequencies for which the phase shift was determined.

In an exemplary embodiment, this data may be obtained using a method as discussed and illustrated with respect to FIG. 4. The calibration table 298 may be includes as part of memory 298 as shown in FIG. 2. The calibration table 298 may include a sweep frequency column 600 and a degree offset column 605 and have particular offset values represented by (Φ, which correspond to a calculated phase offset performed in calibration and used in measurement procedures. Values of column 605 are determined from the calibration procedure described above.

FIG. 5B illustrates an exemplary embodiment of a data profile configured as a voltage data look-up table 296. The voltage date look-up table may be included as part of memory 298 as shown in FIG. 1. In an exemplary embodiment, a disc may be logically segmented into sectors. In an exemplary embodiment, eight or more sectors may be defined. In FIG. 5B, for example, the table 296, column 615 defines particular sectors of an optical disc, and specifically segments the optical disc into 8 sectors. Each sector comprises 45 degrees of the 360 degrees that represent the optical disc. Each sector may be further defined by a radial position from the optical disc's hub. Column 620 may represent an inner radial position. Column 625 may represent a middle radial position and column 630 may represent an outer radial position.

Figure 6:
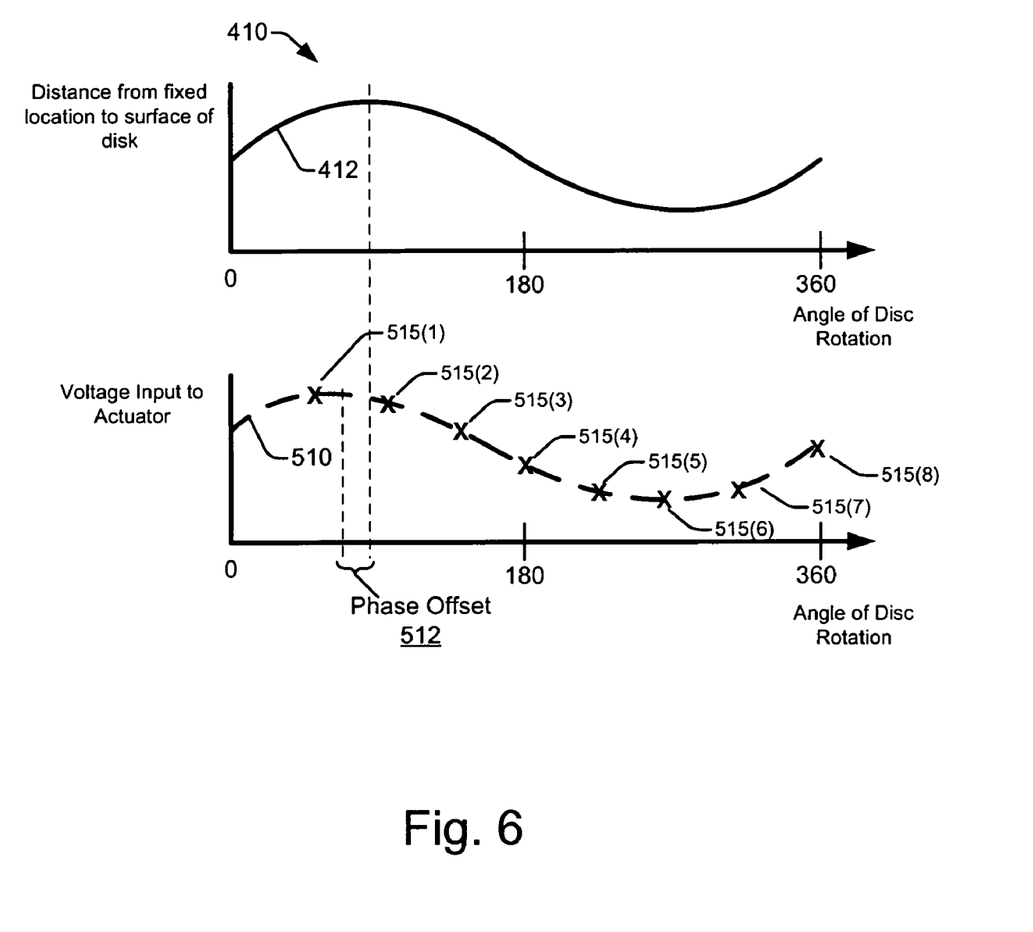
FIG. 6 illustrates an exemplary embodiment of a relative measurement of a print medium at various angular positions and an associated input voltage curve to place optics at particular positions when printing the medium.

FIG. 6 illustrates a curve 410 corresponding, for example, to a curve 410 as shown in FIG. 4. FIG. 6 shows the distance from a fixed location to an annulus defined on the surface of a disc over 360 degrees of rotation. Below the curve 410 is a further exemplary implementation of the data profile, including an exemplary piece-wise continuous function 510 wherein the voltage levels which resulted in the SUM peaks are seen at 515(1) through 515(8). Between the points 515 of the curve 510 are interpolated voltage values. The values may be interpolated by a first order linear function, a second order quadratic function or any other desired technique. For example, any desired point on the curve 510 may be calculated by operation of a Fourier series, a polynomial series or similar technique. In an exemplary embodiment, the table includes values for all of the points at which the values were determined. The values for points between those values may be calculated by an interpolation method, for example fourier series. In an exemplary embodiment, the interpolation calculation is performed every time the values for a location are required. In an exemplary embodiment, the table includes interpolated values, which were determined for all positions prior to printing, and the controller takes the interpolated values from the table as required during operation.

Figure 7:
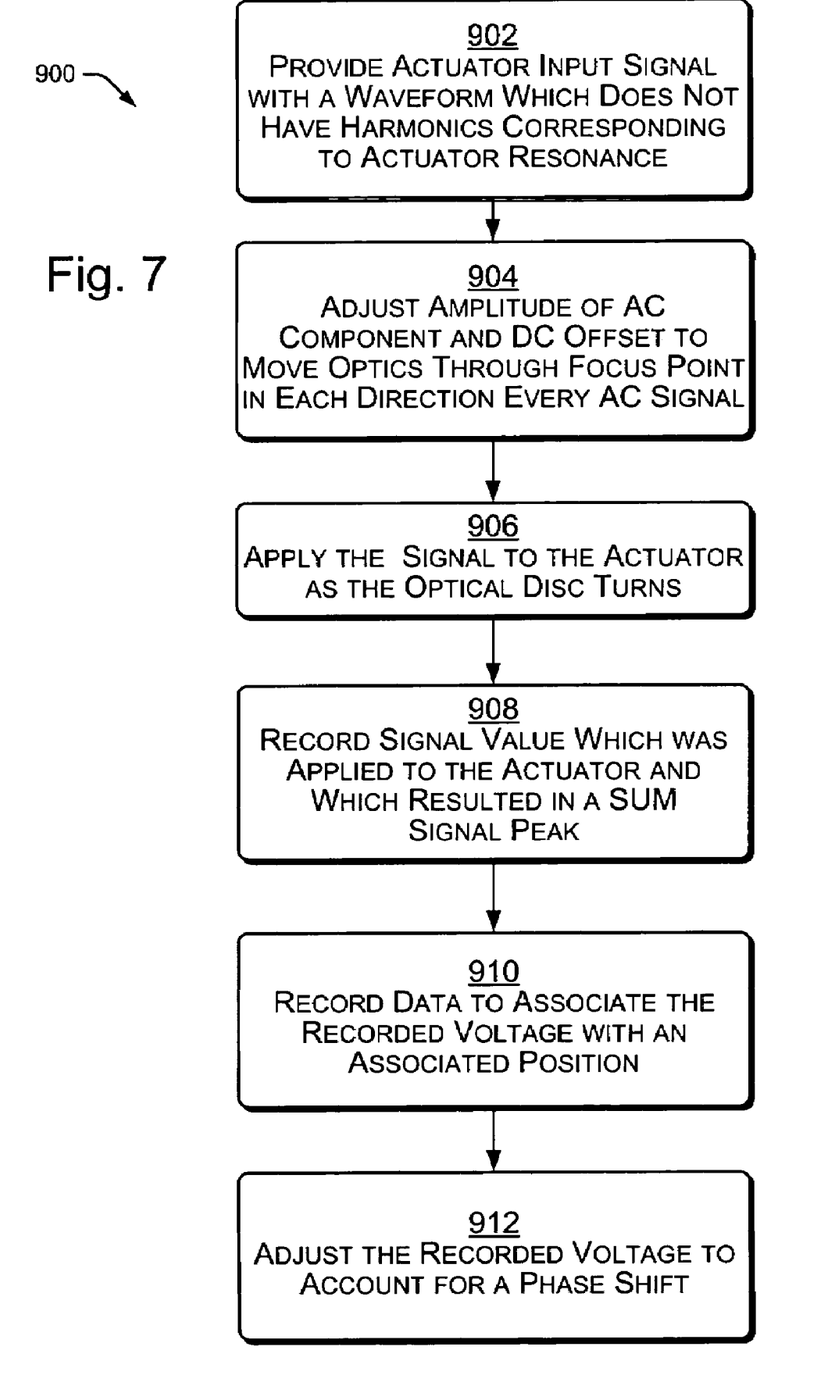
FIG. 7 illustrates an exemplary embodiment of a process for mapping a surface of a print medium.

FIG. 7 illustrates an exemplary process 900 for mapping the surface of a medium to be imaged. In an exemplary embodiment, the medium may be a light-sensitive disc and may be one of a CD, CD-R, CD-ROM, CD-RW, DVD or other optical disc. In an exemplary embodiment, a data profile particular to a specific medium or disc may be configured. In exemplary embodiments, the data profile may be a signal value look-up table (FIGS. 1 and 5B) or a function 510 (FIG. 6) which may be used to calculate a signal, such as a voltage or current level, for input to an actuator. In an exemplary embodiment, the actuator moves optics to focus a light source on an image-able surface of the medium to create an image on the medium, for example, create a label on an optical disc.

In an exemplary embodiment, measurements may be performed for various locations of the surface of the medium. The greater the number of measurements that are determined, the more accurate the mapping of the contour of the surface of the medium. Actuator control signals for areas between measured locations may be estimated by interpolation from locations where the signal was measured and/or is known. In an exemplary embodiment, the locations are measured at a plurality of locations around each of a plurality of radial distances from the center of a disc.

In an exemplary embodiment, a voltage input or signal to the actuator is provided 902 such that its AC component has a frequency that results in the actuator moving the focal optics back and forth through the focal point at least eight times per every revolution (rotation) of the medium or disc. In an exemplary embodiment, the AC component is selected such that it does not have significant harmonics at a resonant frequency of the actuator. In an exemplary embodiment, the AC component is a sinusoidal waveform.

In an exemplary embodiment, the amplitude of the AC component and/or DC offset to the signal is adjusted 904 to result in movement of the optics back and forth through the focus point according to the AC component.

In an exemplary embodiment, the input voltage or signal is applied 906 to the actuator as the optical disc is turned.

In an exemplary embodiment, a signal level, for example the voltage, which was applied to the actuator and which resulted in a SUM signal peak is recorded 908, such as into a lookup table. In an exemplary embodiment, the signal may be used to form a piece-wise continuous function, such as shown in FIG. 6. In an exemplary embodiment, the signal levels may be used to generate coefficients (such as a Fourier series or a polynomial series) which may be used to generate any desired point along a continuous function. In an exemplary embodiment, generating any desired point along the function, or by consulting the voltage look-up table, a voltage level which puts the optics into focus at a location on the surface of the medium may be determined.

In an exemplary embodiment, where a look-up table is used, additional information or data is recorded 910, for example added to the look-up table, to associate or link the recorded voltage values, with an associated position on the surface of the medium, for example with an associated angle (sector) and radial position.

In an exemplary embodiment, the recorded voltage may be associated with a phase shift or lag time that corresponds with a lag time that is associated with the operation of the actuator. In an exemplary embodiment, the look-up table may be altered or adjusted 912 to account for the phase shift. For example, the voltages of curve 420 (FIG. 3A) may be used instead of the voltages of curve 418 (FIG. 3A).

Figure 8:
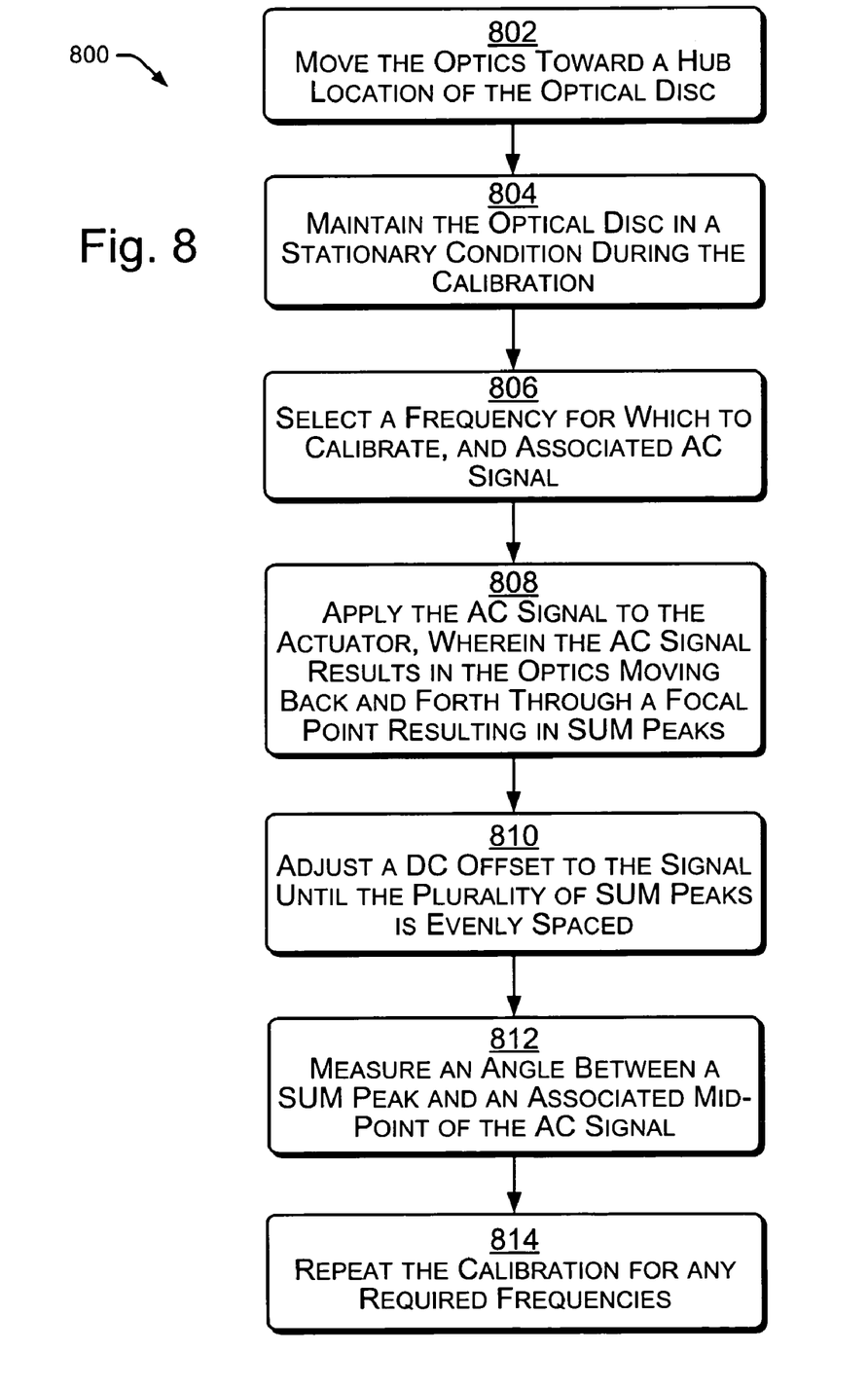
FIG. 8 illustrates an exemplary embodiment of a process for calibrating a marking device.

FIG. 8 illustrates an exemplary process 800 for calibration of an actuator. In an exemplary embodiment, the calibration process may determine a phase lag by which response of the actuator is delayed after application of an input signal, for example an input voltage or current signal.

In an exemplary embodiment, the actuator and the laser, optics and sensors mounted with or near the actuator, are moved 802 to a particular location of the medium, for example a particular radial position of a disc medium which may be an inner hub location of an optical disc.

In an exemplary embodiment, the medium or disc may be maintained 804 in a stationary condition during calibration. Movement of the medium, for example rotation of a disc, during calibration may change the position on the disc at which the optics focuses during calibration, and may thereby reduce the accuracy of the calibration.

In an exemplary embodiment, a frequency is selected 808 at which the actuator sweeps the optics back and forth through the focal point in a direction generally perpendicular to the surface of the medium. The frequency may be selected to be similar to the anticipated frequency of the actuator during use. For example, the frequency may be selected to be similar to the expected frequency of operation during the imaging process. In an exemplary embodiment, the frequency may be selected to be higher than the anticipated frequency during printing. This may satisfy the Nyquist criterion. The Nyquist criteria is for sampling frequency double the greatest frequency to be measured (to accurately estimate (interpolate) in between samples). Since there may be two sum peaks per cycle, the frequency of the actuator may result in twice that frequency of Z distance sampling. If the actuator frequency equals the maximum frequency needed to represent the distance change Z on the surface, the Nyquist criterion is satisfied, and aliasing and hence false estimation of the Z distance in between points may not result.

In an exemplary embodiment, a signal with an AC waveform is applied 808 to the actuator, resulting in the optics being moved back and forth through a focal point. As the signal is applied, a signal generated by the sensors responsive to a reflection of the electromagnetic radiation from the surface of the medium has SUM peaks. The position of the actuator where the SUM signal peaks occur correspond to a position at which the optics are in focus.

In an exemplary embodiment, the DC component to the actuator input signal is adjusted 810 so that the SUM signal peaks are evenly spaced across a cycle of the AC waveform. Having SUM signal peaks evenly spaced may result from having an input voltage at a mid-point of the AC input signal waveform to the actuator.

In an exemplary embodiment, a phase delay may be calculated 812 which may be particular to the frequency of the AC signal. The phase delay may be calculated by comparing the SUM peaks, which correspond to the optics being in focus, and the angular location of the SUM peaks with respect to a midpoint of the AC input signal.

In an exemplary embodiment, the calibration process 800 may be repeated 814 for any other frequencies such as those frequencies at which it is anticipated the actuator may be driven. In an exemplary embodiment, the calibration process may be repeated for frequencies from about 2.75 Hz to about 6.63 Hz.

Figure 9:
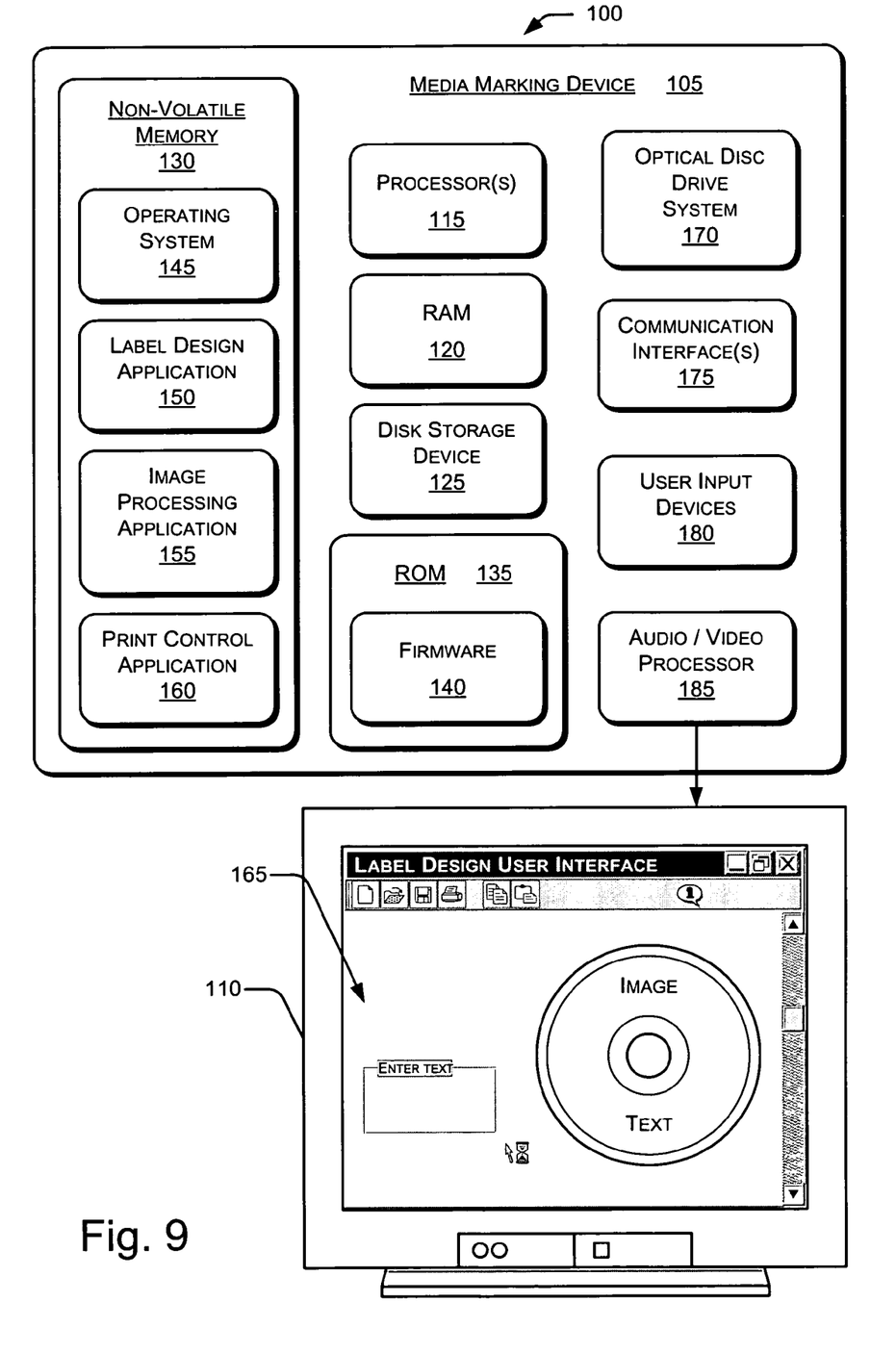
FIG. 9 illustrates an exemplary embodiment of a printing system.

FIG. 9 illustrates an exemplary embodiment of a media marking system 100. In an exemplary embodiment, the media marking system 10 may be a disc media marking system. The media marking system includes a medium 217 (FIG. 1), which may be, for example, an optical disc, such as a digital versatile disc (DVD), recordable compact disc (CD-R), re-writable compact disc (CD-RW). In an exemplary embodiment, the media marking device 105 may be implemented as a stand-alone appliance for creating an image on a medium, for example a disc medium, and/or may be integrated as part of an optical media player or drive for a DVD, CD-R and/or a CD-RW. Such writable CD devices may include, for example, a stand-alone audio CD player which may be a peripheral component in an audio system, a CD-ROM drive integrated as standard equipment in a personal computer (PC), or a DVD player or other embodiments.

In an exemplary embodiment, the media marking device 105 may include one or more processors 115 (e.g., any of microprocessors, controllers, and the like) which process various instructions to control the operation of the media marking device 105 and communicate with other electronic and computing devices. The media marking device 105 may be implemented with one or more memory components, examples of which include a random access memory (RAM) 120, a disc storage device 125, and/or a non-volatile memory 130 (e.g., any one or more of a read-only memory (ROM) 135, flash memory, EPROM, EEPROM, etc. In an exemplary embodiment, the disc storage device 125 may include any type of magnetic or optical storage device, such as a hard disc drive, a magnetic tape, a recordable and/or rewritable compact disc (CD), DVD, DVD+RW, and the like.

In an exemplary embodiment, the one or more memory components may provide data storage mechanisms to store various information and/or data such as configuration information for the media marking device 105, graphical user interface information, and any other types of information and data related to operational aspects of the media marking device 105. Alternative implementations of the media marking device 105 may include a range of processing and memory capabilities, and may include any number of differing memory components other than those shown in FIG. 1.

In an exemplary embodiment, the media marking device 105 may include a firmware component 140 implemented as a permanent memory module stored on ROM 135, or implemented with other components in the media marking device 105, such as a component of a processor 115. Firmware 140 may be programmed and distributed with the media marking device 105 to coordinate operations of the hardware within the media marking device 105 and contains programming constructs used to perform such operations.

In an exemplary embodiment, an operating system 145 and one or more application programs may be stored in non-volatile memory 130 and executed on processor(s) 115 to provide a runtime environment. A runtime environment may facilitate extensibility of the media marking device 105 by allowing various interfaces to be defined that, in turn, allow the application programs to interact with the media marking device 105. In an exemplary embodiment, the application programs include a label design application 150, an image processing application 155, and a print control application 160.

In an exemplary embodiment, a image design application 150, which may be a label design application, may generate an image or label design user interface 165 for display on display device 110 from which a user may create a label image to be rendered on a medium, such as, for example, an optical disc. A user may specify, or otherwise drag and drop text, a bitmap image for background, a digital photo, a graphic or symbol, and/or any combination thereof to create the label image on the user interface 165.

In an exemplary embodiment, an image processing application 155 processes an image. In an exemplary embodiment, the image may be created with an image design user interface 165. In an exemplary embodiment, the image processing application produces a data stream of image data and laser control data to control rendering the image on a printing medium. In an exemplary embodiment, the medium may be an optical disc. In an exemplary embodiment, the image is rendered in concentric circular tracks of a disc media (e.g., an optical disc). For example, a continuous tone RGB (red, green, and blue) rectangular raster graphic of the label image may be converted to concentric circular tracks. The curved raster may be color mapped and separated into the printing color channels KCMY (black, cyan, magenta, and yellow), or grayscale. This data stream may be formatted as laser control data and is augmented with other control commands to control the media marking device 105 rendering an image or label on the disc medium.

In an exemplary embodiment, an image file or label file may be generated which may be communicated to a controller where the image file is parsed to control an imaging mechanism. In an exemplary embodiment, concentric circular tracks may be generated and streamed to the media marking device 105 one track at a time to utilize host processing with the device's rendering process.

In an exemplary embodiment, a print control application 160 may determine the radius of a first track and subsequent track spacing. After the radius of the first track and the track spacing are determined, the print control application 160 may determine which image data will correspond to each respective track. In an exemplary embodiment, laser mark locations along a particular track may be specified in a coordinate system where the concentric circular tracks are defined in coordinates of the radial distance and the distance along each respective track.

In an exemplary embodiment, the media marking device 105 includes a drive system 170, for example an optical disc drive (ODD) system, which may be implemented to mark on a surface of a disc media (i.e., optical disc), such as to render a label image on a side of the medium. In an exemplary embodiment, the medium is an optical disc with one side which has data and one side on which an image can be formed, which may be referred to as a label surface of the optical disc. The drive system 170 is discussed above with reference to FIG. 1.

In an exemplary embodiment, a media marking device 105 further includes one or more communication interfaces 175 which may be implemented as any one or more of a serial and/or parallel interface, as a wireless interface, any type or network interface, and as any other type of communication interface. A wireless interface may enable the media marking device 105 to receive control input commands and other information from an input device, such as from a remote control device or from another infrared (IR), 802.11, Bluetooth, or similar RF input device. In an exemplary embodiment, a network interface may provide a connection between the media marking device 105 and a data communication network which allows other electronic and computing devices coupled to a common data communication network to send label image data and other information to the media marking device 105 via the network. In an exemplary embodiment, a serial and/or parallel interface may provide a data communication path directly between the media marking device 105 and another electronic or computing device.

In an exemplary embodiment, a media marking device 105 may include user input devices 180 which may include a keyboard, pointing device, selectable controls on a user control panel, and/or other mechanisms for interacting with and/or inputting information to the media marking device 105. In an exemplary embodiment, the media marking device 105 includes an audio/video processor 185 which generates display content for display on a display device 110, and which may generate audio content for presentation by a presentation device, such as one or more speakers (not shown). The audio/video processor 185 may include a display controller which processes the display content to display corresponding images on display device 110. A display controller may be implemented as a graphics processor, microcontroller, integrated circuit, and/or similar video processing component to process the images. Video signals and audio signals may be communicated from the media marking device 105 to display device 110 via an RF (radio frequency) link, S-video link, composite video link, component video link, or other similar communication link.

In an exemplary embodiment, some of the components of a media marking device 105 which are shown separately in FIG. 1 may be implemented in an application specific integrated circuit (ASIC). In an exemplary embodiment, a system bus (not shown) may connect the various components within a media marking device 105. A system bus may, for example, be implemented as one or more of any of several types of bus structures, including a memory bus or memory controller, a peripheral bus, an accelerated graphics port, or a local bus using any of a variety of bus architectures. Furthermore, the media marking device 105 may share a system bus with a host processor.

Figure 10:
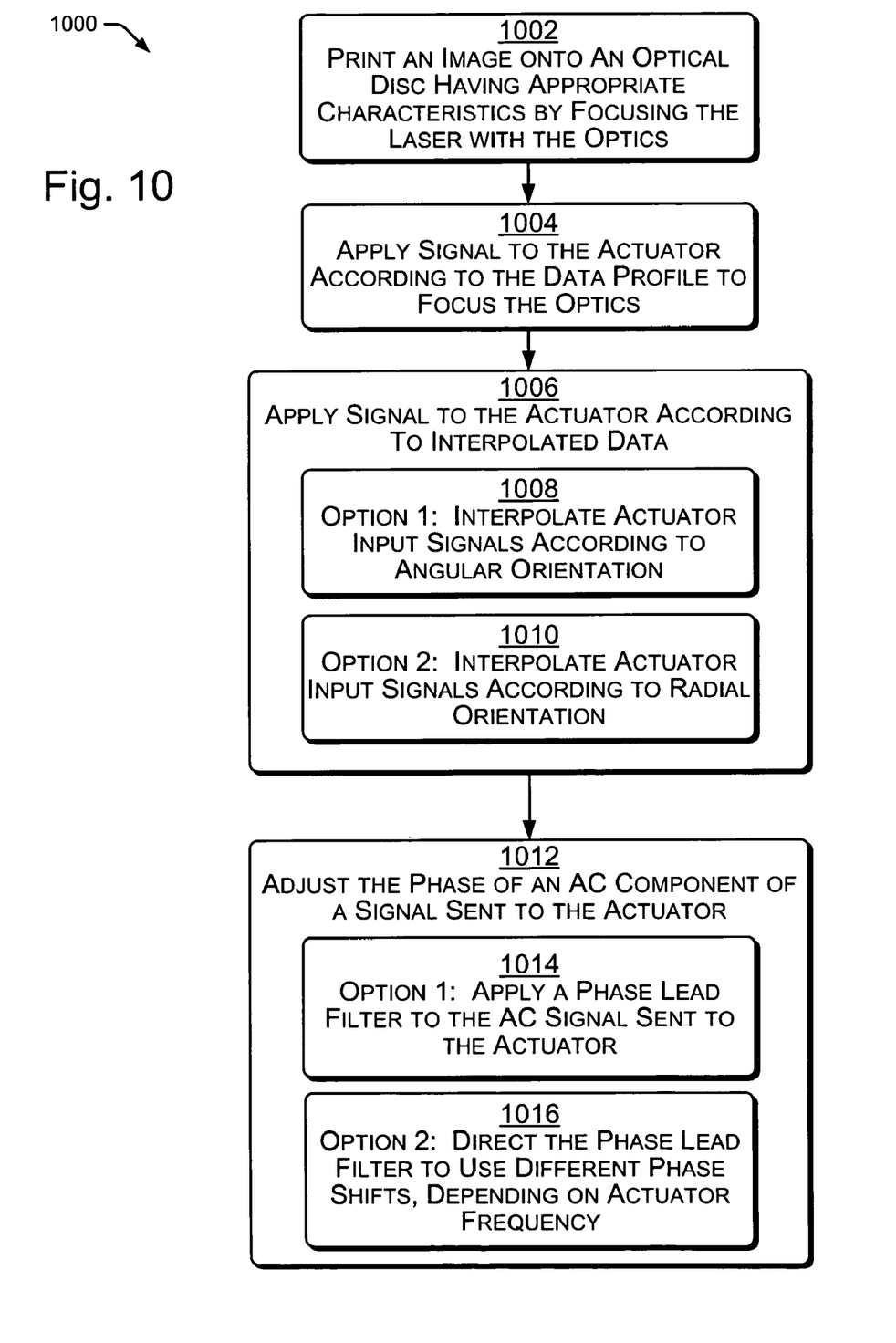
FIG. 10 illustrates an exemplary embodiment of a process for printing.

FIG. 10 illustrates an exemplary process 1000 for imaging, for example printing or marking, a medium such as the label side of an optical disc. Printing may be performed using the media marking system of FIG. 1. In an exemplary embodiment, imaging is performed using data profile associated with the specific disc to be labeled, wherein the date profile was obtained by method 900 above. In an exemplary embodiment, the data profile provides information needed to provide input to the actuator.

In an exemplary embodiment, the process 1000 may include printing 1002 of an image within an image-able area of a medium, which may be a label region of an optical disc. In an exemplary embodiment, printing 1002 may be performed by focusing a laser using the focal optics 220 (FIG. 1) on a photo sensitive material within the image-able region. The image-able regions, or label area of a disc, may have been previously been measured for creation of a data profile (e.g. a signal value, such as voltage or current, stored in a look-up table) to facilitate maintaining optical focus during the labeling process.

In an exemplary embodiment, the process 1000 may include continuously referring 1004 a look-up table for application to the actuator to move the optics into focus for each location on the medium or disc. In an exemplary embodiment, the look-up table includes values obtained by periodically moving an actuator through a focal point, responsive to an input signal with a waveform, wherein the waveform does not correspond to a resonant frequency of the actuator and does not include higher harmonics corresponding to a resonant frequency of the actuator.

In an exemplary embodiment, the process 1000 may include calculating 1006, for a given location with in the image-able region, using signal information related to adjacent locations of the label region. For example, optionally at block 1008, signal data associated with different disc sectors may be interpolated. Similarly, at block 1010, optionally, signal data associated with different radial distances may be interpolated. In all cases, interpolation may be done with first or higher order equations, such as linear approximations, spline curve fits, etc.

In an exemplary embodiment, the process 1000 may include adjusting 1012 the phase of an AC component of a signal sent to the actuator to compensate for a phase-lag in the response of the actuator. In one exemplary embodiment, the AC signal sent to the actuator is processed 1012 by a phase lead filter 245 (FIG. 1). In an exemplary embodiment, the phase lead filter provides the actuator with a signal which will position the actuator while compensating for the phase lag of the actuator. In another exemplary embodiment, the phase lead filter is directed to filter 1016 for a variety of different actuator frequencies, depending on the frequency of the AC component to be input to the actuator.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of mapping a surface of a printable medium, comprising:
   illuminating the surface with electromagnetic radiation;
   focusing the electromagnetic radiation at the surface with a focusing mechanism;
   modulating the position of the focusing mechanism using an actuator, wherein the actuator has a resonant frequency; and
   providing an input signal to the actuator, wherein the input signal comprises an AC waveform having a frequency, wherein the frequency does not correspond to the resonant frequency and wherein the AC waveform does not have higher harmonics corresponding to the resonant frequency.

2. The method of claim 1, wherein the AC waveform comprises a sinusoidal waveform.

3. The method of claim 1, wherein the AC waveform has a frequency in a range from about 2.74 Hz to about 6.63 Hz.

4. The method of claim 1, wherein the AC waveform comprises a sinusoidal waveform with a frequency in a range from about 2.74 Hz to about 6.63 Hz.

5. The method of claim 1, wherein the electromagnetic radiation comprises a laser beam from a laser.

6. The method of claim 1, wherein the resonant frequency is less than 100 Hz.

7. The method of claim 1, wherein the input signal comprises an AC voltage signal.

8. The method of claim 1, further comprising sensing the magnitude of reflected electromagnetic radiation with an electromagnetic radiation sensor.

9. The method of claim 8, wherein the electromagnetic radiation sensor comprises a photo sensor.

10. The method of claim 8, wherein sensing the magnitude of reflected electromagnetic radiation comprises generating a SUM signal from a plurality of photo sensors.

11. The method of claim 8, further comprising recording input signal values corresponding to a position of the actuator at a time corresponding to a SUM signal peak.

12. The method of claim 11, wherein recording input signal values comprises storing the input signal values in an input signal value table.

13. The method of claim 12, wherein the input signal values are voltage values.

14. A method of mapping a surface of an optical disc comprising:
    illuminating the surface with a laser beam generally perpendicular to the surface;
    focusing the laser beam through optics;
    modulating the position of the optics relative to the surface, wherein the position is modulated using an actuator and the actuator has a resonant frequency; and
    providing an input voltage signal to the actuator, wherein the input voltage signal comprises a sinusoidal AC waveform, wherein the sinusoidal AC waveform does not correspond to the resonant frequency and does not have higher harmonics which correspond to the resonant frequency.

15. A method of calibrating a focus actuator of a light-sensitive printer, comprising:
    illuminating a surface of a light-sensitive print medium with a laser beam;
    cyclically modulating a position of the optics actuator in a direction generally perpendicular to the surface;
    determining a phase angle by which the position of the actuator lags an input signal, wherein the input signal comprises a sinusoidal AC voltage signal.

16. The method of claim 15, further comprising:
    determining the phase angle by which the position of the actuator lags an input signal for a plurality of input signals, wherein the input signals comprise sinusoidal AC voltages each with different frequencies.

17. The method of claim 15, wherein the different frequencies do not correspond to a resonant frequency of the actuator.

18. The processor-readable medium of claim 15, wherein the waveform comprises a sinusoidal waveform.

19. The processor-readable medium of claim 15, wherein the waveform comprises a sinusoidal waveform with a frequency in a range from about 2.74 Hz to about 6.63 Hz.

20. The processor-readable medium of claim 15, wherein generating the data profile comprises further instructions for configuring a look-up table with signal data, wherein the signal data are associated with focusing on locations within the label region.

21. A processor-readable medium comprising processor-executable instructions for focusing optics, the processor-executable instructions comprising instructions for:
    generating a data profile, wherein the data profile is configured to provide signals for operation of an actuator, wherein the signals result in focus of the optics on a label region of a surface of an optical disc, and wherein an input waveform signal for mapping the surface of the optical disc has a waveform which does not have higher harmonics that correspond to a resonant frequency of the actuator.

22. A processor-readable medium comprising processor-executable instructions for focusing optics, the processor-executable instructions comprising:
  instructions for generating a data profile, wherein the data profile is configured to provide signals for operation of an actuator, wherein the signals result in focus of the optics on a label region of an optical disc;
  instructions for printing an image on the label region of the optical disc whiled focusing the optics by applying signals to the actuator according to the data profile;
  instructions for applying a sinusoidal AC component of a signal to the actuator as the optical disc rotates, wherein the sinusoidal AC component causes the optics to pass through a focal point in both directions on each cycle of the sinusoidal AC component; and
  instructions for recording a voltage into a voltage data look-up table, wherein the voltage is associated with a SUM signal peak which resulted from the passage of the optics through the focal point as the voltage was applied to the actuator.

23. A processor-readable medium comprising processor-executable instructions for focusing optics, the processor-executable instructions comprising:
  instructions for generating a data profile, wherein the data profile is configured to provide signals for operation of an actuator, wherein the signals result in focus of the optics on a label region of an optical disc;
  instructions for printing an image on the label region of the optical disc whiled focusing the optics by applying signals to the actuator according to the data profile;
  instructions for calibrating the actuator to determine an angle by which the actuator lags an input signal for frequencies associated with printing the image at least two radial distances from a hub of the optical disc;
  instructions for organizing the data profile according to the at least two radial distances and according to signals resulting in focus in a plurality of sectors of the optical disc;
  instructions for applying a sinusoidal AC signal to the actuator, wherein the AC signal results in the actuator moving the optics back and forth through a focal point causing a plurality of SUM signal peaks;
  instructions for adjusting a DC offset to the signal until the plurality of SUM signal peaks are evenly spaced; and
  instructions for measuring an angle between a SUM signal peak and an associated mid-point of the AC signal.

24. A light-sensitive printer, comprising:
  means for generating a beam of electromagnetic radiation;
  means for focusing the beam onto a surface of a printable medium;
  an actuator for modulating the position of the focusing means, the actuator having a resonant frequency; and
  means for providing an input signal to the actuator, wherein the input signal comprises an AC waveform having a frequency, and wherein the frequency does not correspond to the resonant frequency and the AC waveform does not have a higher harmonic which corresponds to the resonant frequency.

25. The printer of claim 24, comprising:
  means for sensing a magnitude of the electromagnetic radiation reflected from the surface.

26. The printer of claim 24, comprising:
  means for recording a value of the input signal corresponding to a position of the focusing means at a time corresponding to a peak of the magnitude.

27. The printer of claim 24, wherein the AC waveform comprises a sinusoidal AC waveform.

28. A light-sensitive printer, comprising:
  a laser configured to generate a beam of electromagnetic radiation;
  a focusing arrangement configured to focus the beam onto a surface of a printable medium;
  an actuator configured to modulate the position of the focusing arrangement, the actuator having a resonant frequency; and
  a controller configured to provide an input signal to the actuator, wherein the input signal comprises an AC waveform having a frequency, wherein the frequency does not correspond to the resonant frequency and the AC waveform does not have a higher harmonic which corresponds to the resonant frequency.

29. The printer of claim 28, comprising:
  a photosensor communicatively coupled to the controller and configured to sense a magnitude of the electromagnetic radiation reflected from the surface.

30. The printer of claim 28, comprising:
  a memory communicatively coupled to the controller and configured to record a value of the input signal corresponding to a position of the focusing arrangement at a time corresponding to a peak of the magnitude.

31. The printer of claim 28, wherein the AC waveform comprises a sinusoidal AC waveform.

* * * * *